United States Patent [19]

Adenau

[11] Patent Number: 4,887,737

[45] Date of Patent: Dec. 19, 1989

[54] DISPENSING DEVICE WITH SENSORY ALERT

[75] Inventor: Marvin L. Adenau, Barrington, Ill.

[73] Assignee: Thomas A. Schutz Co., Inc., Morton Grove, Ill.

[21] Appl. No.: 205,444

[22] Filed: Jun. 10, 1988

[51] Int. Cl.[4] .................................... B65G 59/00

[52] U.S. Cl. .................................... 221/3; 221/192; 221/232; 312/71

[58] Field of Search .................... 221/3, 192, 229, 232, 221/254, 276; 211/59.2, 59.3; 312/35, 71

[56] References Cited

U.S. PATENT DOCUMENTS

| | | | |
|---|---|---|---|
| 1,592,720 | 7/1926 | Butler | 221/3 |
| 1,755,655 | 4/1930 | Langenfeld | 221/276 X |
| 2,304,533 | 12/1942 | Bright | 221/3 X |
| 2,824,666 | 2/1958 | Hausladen | 221/232 |
| 3,161,295 | 12/1964 | Chesley | 211/59.3 |
| 3,563,410 | 2/1971 | Murray | 221/3 X |
| 4,494,658 | 1/1985 | Simon et al. . | |
| 4,537,316 | 8/1985 | Simon et al. . | |
| 4,730,741 | 3/1988 | Jackle et al. | 312/71 X |

OTHER PUBLICATIONS

Spring-Load Cartridge Sketch (date and place of publication unknown).

*Primary Examiner*—F. J. Bartuska
*Attorney, Agent, or Firm*—Wood, Dalton, Phillips, Mason & Rowe

[57] ABSTRACT

The device consists of a frame defining a receptacle for an article to be normally displayed in a first position, structure on the frame for inhibiting grasping by a purchaser of an article in the first position, a trigger movable relative to the frame between a normal position and a release position for moving an article from the first position relative to the frame to a removal position as an incident of movement of the trigger from the normal position to the release position, and structure responsive to movement of the trigger from the normal position to the release position for giving a sensory indication that the trigger has been moved from the normal position to the release position and that resultingly an article has been situated in the removal position. With an article in the removal position, the article can be readily grasped by a purchaser for withdrawal of that article from the receptacle.

13 Claims, 2 Drawing Sheets

FIG. 1
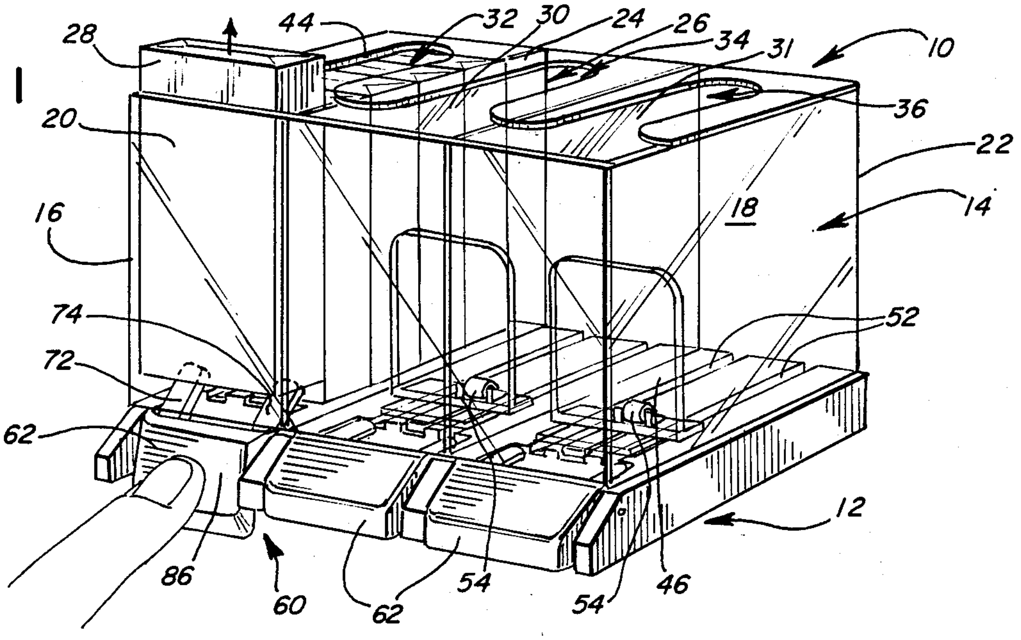
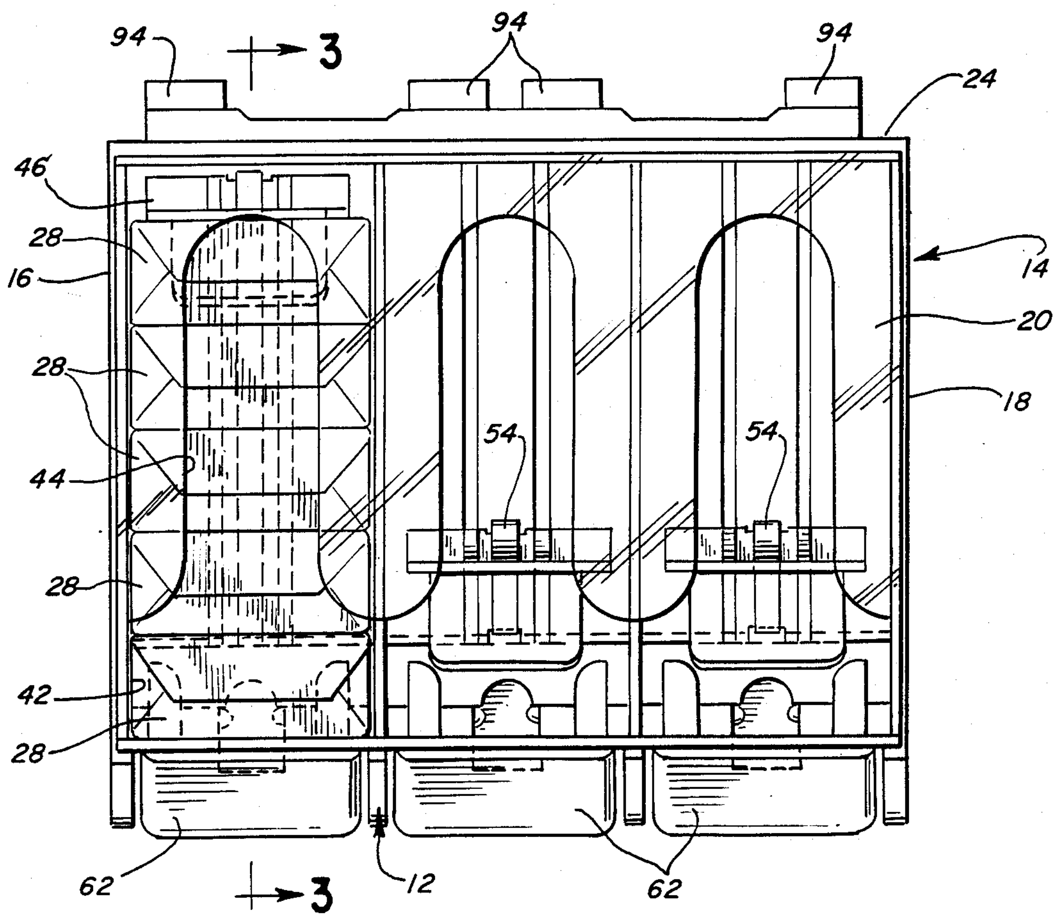
FIG. 2

DISPENSING DEVICE WITH SENSORY ALERT

BACKGROUND OF THE INVENTION

1. Field of the Invention

This invention relates to display devices as commonly used for merchandise in retail establishments and, more particularly, to structure for giving a sensory indication that an article of merchandise has been removed from the display device.

2. Background Art

It is known to provide displays for merchandise in small packages such as cigarettes, chewing gum, candy bars and the like near checkout counters in retail establishments. Normally, such merchandise is placed in bins or on shelves so as to be readily visible and accessible to purchasers. The problem that purveyors of such goods face is that the above noted articles are frequently the target of shoplifters. Such articles can be readily discreetly removed from the particular display and concealed from a checkout person. Despite the fact that these goods are normally placed in the vicinity of the checkout person specifically so that thefts can be avoided, the checkout person is frequently distracted, as when operating a cash register.

SUMMARY OF THE INVENTION

The present invention is specifically directed to overcoming the above enumerated problems in a novel and simple manner.

The present invention comprehends a theft resistant device for displaying articles. The device consists of a frame defining a receptacle for an article to be normally displayed in a first position, structure on the frame for inhibiting grasping by a purchaser of an article in the first position, a trigger movable relative to the frame between a normal position and a release position for moving an article from the first position relative to the frame to a removal position as an incident of movement of the trigger from the normal position to the release position, and structure responsive to movement of the trigger from the normal position to the release position for giving a sensory indication that the trigger has been moved from the normal position to the release position and that resultingly an article has been situated in the removal position. With an article in the removal position, the article can be readily grasped by a purchaser for withdrawal of the article from the receptacle.

Accordingly, a purchaser can only conveniently grasp and withdraw an article from the device by first actuating the trigger and repositioning an article that is displayed in the first position. This produces a sensory signal to alert the checkout person, or other person in the vicinity, that an article is being removed from the receptacle. A would-be thief is thus placed on guard that his or her activities are possibly being monitored by the checkout person.

Preferably, the sensory indication is an audible sound. In a preferred form, a clicker is associated with the trigger and is caused to emit a sharp "click" loud enough to be heard by the checkout person. Often, upon hearing this noise, the checkout person will instinctively turn to the display device, thereby deterring any would-be thief.

The invention comprehends other sensory indications of the trigger actuation. For example, the trigger could illuminate a light that would be visible to the checkout person.

The inventive device is simple in construction yet a positive deterrent to thieves. In a preferred form of the invention, the trigger is pivotably mounted to the frame and has a surface which directly engages an article in the first position to reposition the article to facilitate its removal.

Preferably, a plurality of articles are accommodated by the receptacle and structure is provided to urge the articles towards the first position, wherein they may be serially situated for removal by actuation of the trigger.

The frame is constructed so that the receptacle must be loaded through a single opening through which articles in the first position are removed. Thus, the removal of only one article at a time from the receptacle can occur.

Another aspect of the invention is the provision of structure on the frame to removably mount the display from a vertical surface.

BRIEF DESCRIPTION OF THE DRAWINGS

FIG. 1 is a perspective view of a preferred form of display device according to the present invention;

FIG. 2 is an enlarged plan view of the display in FIG. 1;

DETAILED DESCRIPTION OF THE DRAWINGS

Figure 3:
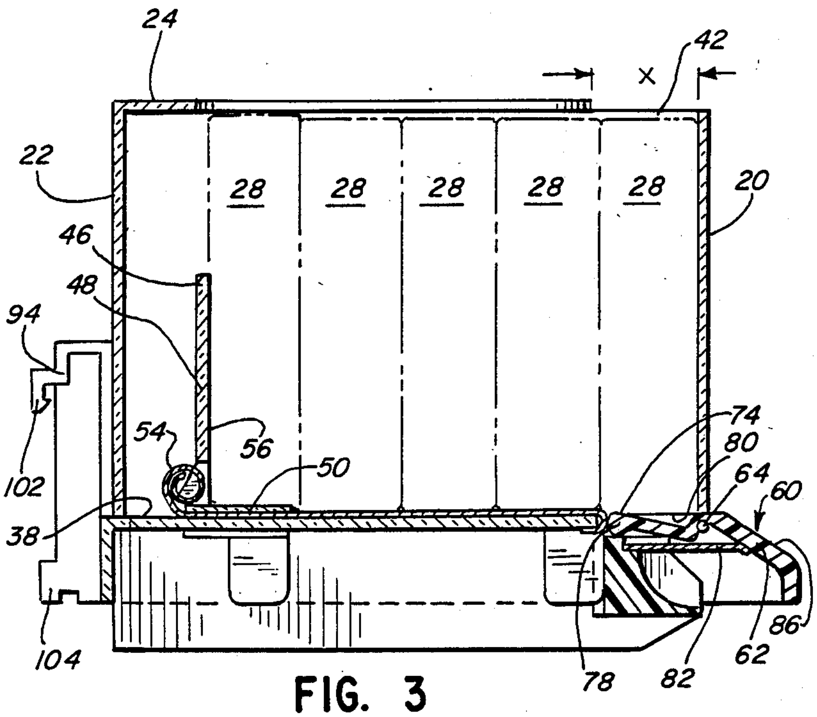
FIG. 3 is a sectional view of the display device taken along line 3—3 of FIG. 2.

A preferred form of the display device is shown at 10 in the drawings. The depicted device 10 is used to display and dispense packs of cigarettes. However, it should be understood that the invention is not limited to the particular identity of articles, as the invention would function in the same manner and equally effectively with different articles such as packs of gum, candy, etc.

The display device consists of a base at 12 and thereabove a housing at 14, with the base 12 and housing 14 suitably joined to define a unitary frame assembly. The housing 14 has an overall squared configuration with side walls 16, 18, front and rear walls 20, 22, respectively, and top wall 24, cooperatively defining, in conjunction with the base 12, a space 26 for the storage of articles 28, in this case cigarette packs. Partition walls 30, 31 divide the space 26 into three separate article receptacles 32, 34, 36, each of substantially identical configuration. As seen clearly in FIG. 3, the receptacles 32, 34, 36 will each closely receive a plurality of the cigarette packs 28. The cigarette packs 28 are supported on an upwardly facing surface 38 on the top wall 40 of the base.

Each of the three receptacles 32, 34, 36 has essentially the same construction and the description herein will be limited to exemplary receptacle 32, on the left side of the display device 10 in FIG. 1. The receptacle 32 is surrounded by a continuous peripheral wall surface defined by the side wall 16, partition wall 30, front wall 20 and rear wall 22. The articles 28 can only be placed in and removed from the receptacle 32 through an opening 42 in the top wall 24. As seen in FIG. 3, the opening 42 has a dimension X in the fore and aft direction slightly greater than the thickness of one of the cigarette packs 28 and has a slightly greater width than the packs 28. To load the packs 28 into the receptacle 32, the packs 28 are directed one-by-one downwardly through the opening 42 and pressed rearwardly under the top wall 24. A cutout 44 in the top wall 24 accommodates an individual's fingers to facilitate rearward shifting of the packs 28. The cutout 44 has a width that is less than the width of the cigarette packs 28 so that the packs 28 cannot be removed therethrough.

The articles 28 in the receptacle 32 are urged towards the front of the device by a translatable wall 46. The wall 46 is L-shaped and has an upright wall portion 48 and a horizontal wall portion 50 with pegs (not shown) guided in tracks 52 for translatory movement of the wall 46 in a fore and aft direction within the receptacle 32. A recoil spring 54, attached at its ends to the wall 46 and base wall 40, urges the wall 48 towards the front of the device 10. As this occurs, a forwardly facing surface 56 on the wall 46 bears the articles 28 facially against the rearwardly facing surface 58 of the front wall 20.

With the device 10 loaded as shown in FIG. 3, only the article 28 in the first position can be removed from the device 10. However, the front wall 20, side wall 16, and partition wall 30 cooperatively inhibit grasping of the forwardmost package 28 by the hand of a purchaser.

According to the invention, a trigger mechanism at 60 is provided on the base and associated with each receptacle 32, 34, 36 to reposition an article 28 in the first position so that it can be more readily grasped as between the fingers of a purchaser. The trigger mechanism 60 consists of a one-piece trigger 62 having integrally formed, laterally oppositely projecting posts 64, 66 which are received in seats 68, 70 in the base 12 so as to guide pivoting of the trigger 62 relative to the base 12 about a substantially horizontal axis. The axis of rotation is located in substantially vertical coincidence with the front wall 20.

The trigger 62 has a pair of legs 72, 74 projecting rearwardly therefrom in cantilever fashion. Each of the legs 72, 74 has, at its free end, an enlarged, rounded nose 76, 78, respectively. In the normal position for the trigger 62, shown in FIG. 3, the noses 76, 78 simultaneously bear on the underside 80 of a pack 28 in the first position.

The trigger 62 is normally biased in a counterclockwise direction in FIG. 3 by a clicker/spring 82, which will be described more fully below. Counterclockwise pivoting of the trigger 62 is arrested with the noses 76, 78 abutting upwardly facing surfaces 84 on the base 12.

By pressing downwardly on the forward, exposed portion 86 of the trigger 62, the trigger 62 is caused to pivot in a clockwise direction in FIG. 3, thereby lifting the pack 28 from the first position through the opening 42 in the top wall 24 to the position shown in FIG. 1 wherein a user can readily grasp the pack 28 between his or her fingers and remove the pack 28 from the device 10.

Figure 4:
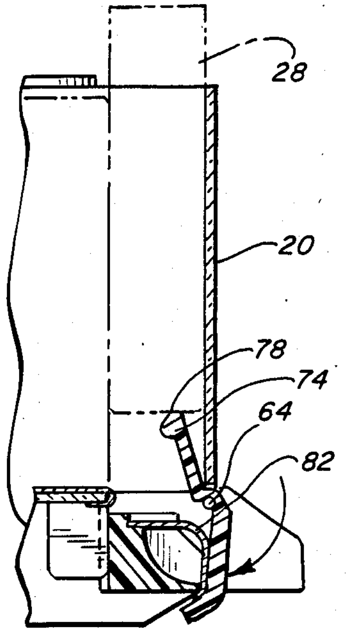
FIG. 4 is a fragmentary view of the device as in FIG. 3 with an article moved by a trigger mechanism to a removal position.
Figure 5:
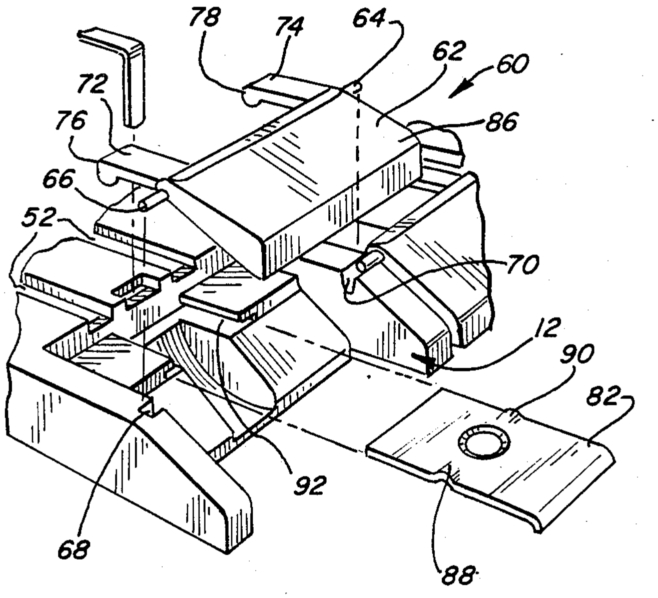
FIG. 5 is an exploded perspective view of the trigger mechanism on the display device.

As the trigger 62 is pivoted from the normal position in FIG. 3, to a release position shown in FIG. 4, the clicker/spring 82 is progressively deflected. The clicker/spring is a dual purpose element. As previously described, its one function is to bias the trigger 62 towards its normal, FIG. 3 position.

The clicker/spring 82 is also constructed to produce a clearly audible clicking noise as it is deformed between its FIG. 3 and FIG. 4 positions. The clicker/spring 82 is made from a spring-type sheet metal material and has integrally formed, upraised ribs 88, 90. The clicker/spring 82 is slidably received in a seat 92 in the base 12 and is frictionally held in position by the ribs 88, 90. Similar type clicker arrangements are used on children's toys to produce a loud clicking noise.

It can be seen from the foregoing description that packages 28 are loaded into and removed from the receptacle 32 one at a time only through the opening 42. Once the packs 28 are loaded as in FIG. 3, the forwardmost pack is the only pack 28 that can be removed. The forwardmost pack 28 is shielded by the housing 14 and thus can only be conveniently removed by operating the trigger 62 to reposition the pack 28 from the FIG. 3 position to the FIG. 4 position. As this occurs, the clicker/spring 82 produces a sharp sound that alerts persons in the vicinity that a pack 28 is in the FIG. 4 position to be removed. This will get the checkout person's attention and deter would-be thieves.

Figure 6:
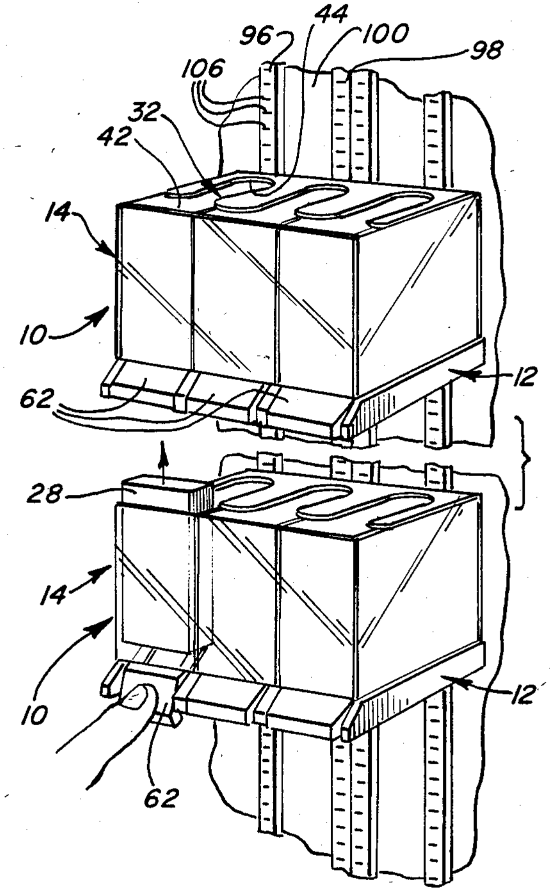
FIG. 6 is a perspective view of a plurality of like display devices mounted from a vertical support surface.

Another aspect of the invention is the provision of a hanger 94 at the rear of the device 10. Each hanger 94 cooperates with a pair of elongate, slotted rails 96, 98 carried on a vertical wall surface 100. The hanger 94 has depending leg pairs 102, 104 to seat in slots 106 on the rails 96, 98, to selectively fix the location of the device at a desired height. As shown in FIG. 6, a plurality of like devices 10 can be provided on a single wall surface 100.

To facilitate viewing of the articles 28 contained in the device 10, the front and side walls 20, 16, 18, consecutively, can be made from a clear material. Alternatively, the front wall 20 can be cut out so as to expose the forwardmost article 28, without providing sufficient room for the article 28 to be removed.

It should be understood that the foregoing detailed description was made for purposes of demonstrating a preferred form of the invention and its operation and no unnecessary limitations should be understood therefrom.

I claim:

1. A theft resistant device for displaying articles, said device comprising:

a frame defining a receptacle for an article to be normally displayed in a first position;

means on the frame for inhibiting grasping by a purchaser of an article in the first position;

trigger means mounted to the frame for pivoting movement between a normal position and a release position for moving an article from the first position relative to the frame to a removal position as an incident of said trigger means being pivoted from said normal position to said release position, said removal position being such that an article in said removal position can be more readily grasped by a purchaser than an article in said first position; and means at all times engaged with and having at least a portion that follows movement of the trigger means for giving a sensory indication that the trigger means has been moved from the normal position to the release position and that resultingly an article has been situated in the removal position as an incident of the trigger means being moved from its normal position to its release position, wherein said means for giving a sensory indication comprises means for producing an audible sound as an incident of said trigger means being moved from said normal position to said release position.

2. The theft resistant article displaying device according to claim 1 wherein said frame receptacle accepts a plurality of articles and means are provided for urging articles in said receptacle towards said first position.

3. The theft resistant article displaying device according to claim 1 including means for removably mounting the frame on a vertical support surface.

4. A theft resistant device for displaying articles, said device comprising:

a frame defining a receptacle for an article to be normally displayed in a first position;

means on the frame for inhibiting grasping by a purchaser of an article in the first position;

trigger means mounted to the frame for pivoting movement between a normal position and a release position for moving an article from the first position relative to the frame to a removal position as an incident of said trigger means being pivoted from said normal position to said release position, said removal position being such that an article in said removal position can be more readily grasped by a purchaser than an article in said first position; and means at all times engaged with and having at least a portion that follows movement of the trigger means for giving a sensory indication that the trigger means has been moved from the normal position to the release position and that resultingly an article has been situated in the removal position as an incident of the trigger means being moved from its normal position to its release position, wherein said means for giving a sensory indication comprises a clicker that upon being deflected produces an audible sound and means for mounting the clicker to the frame and cooperating means are provided on the trigger means and clicker for deflecting the clicker and producing an audible sound as the trigger means is moved from the normal position to the release position.

5. A theft resistant device for displaying articles, said device comprising:

a frame defining a receptacle for an article to be normally displayed in a first position;

means on the frame for inhibiting grasping by a purchaser of an article in the first position;

trigger means movable relative to the frame between a normal position and a release position for moving an article from the first position relative to the frame to a removal position as an incident of movement of said trigger means from said normal position to said release position, said removal position being such that an article in said removal position can be more readily grasped by a purchaser than an article in said first position; and means responsive to movement of the trigger means from the normal position to the release position for giving a sensory indication that the trigger means has been moved from the normal position to the release position and that resultingly an article has been situated in the removal position, wherein said means for giving a sensory indication comprises a clicker that upon being deflected produces an audible sound and means for mounting the clicker to the frame and cooperating means are provided on the trigger means and clicker for deflecting the clicker and producing an audible sound as the trigger means is moved from the normal position to the release position, wherein said clicker comprises a spring metal element and said means mounting the clicker to the frame mounts the clicker so that the clicker biases the trigger towards its normal position.

6. The theft resistant article displaying device according to claim 5 wherein cooperating means are provided on the clicker and frame for sliding the clicker into assembled relationship with the frame.

7. A theft resistant device for displaying articles, said device comprising:

a frame defining a receptacle for a plurality of articles and including means to display at least one of the articles for viewing in a first position;

means on the frame for urging articles on said receptacle towards said first position so that when an article is removed by a purchaser from said first position another articles is urged into said first position;

means on the frame for prohibiting removal of articles in said receptacle that are not in said first position;

means on the frame for inhibiting grasping by a purchaser of an article in the first position;

trigger means movable relative to the frame between a normal position and a release position for moving an article from the first position relative to the frame to a removal position as an incident of movement of said trigger means from said normal position to said release position, said removal position being such that an article in said removal position can be more readily grasped by a purchaser than an article in said first position; and means at all times engaged with the trigger means for giving a sensory indication that the trigger means has been moved from the normal position to the release position and that resultingly an article has been situated in the removal position as an incident of the trigger means being moved from its normal position to its release position, wherein said means for giving a sensory indication comprises means for producing an audible sound.

8. The theft resistant article displaying device according to claim 7 wherein said urging means comprises a wall to engage articles in the receptacle, means mounting the wall for translatory movement relative to the frame and spring means for urging the wall in one direction of translatory movement relative to the frame.

9. The theft resistant article displaying device according to claim 7 wherein said frame has an opening to permit passage therethrough of only a single article through which opening articles can be loaded one-by-one into and removed from the receptacle.

10. The theft resistant article displaying device of claim 9 wherein said opening is in alignment with an article in the first position and in the removal position an article projects through said frame opening.

11. The theft resistant article displaying device of claim 7 wherein said trigger means comprises a trigger and means for pivotally mounting the trigger for movement between said normal position and release position and said trigger has a surface to engage an article in said receptacle in said first position and move an article from the first position to the removal position as the trigger is pivoted from the normal position to the release position.

12. The theft resistant article displaying device of claim 11 wherein means are provided for biasing the trigger to its normal position.

13. A theft resistant device for displaying articles, said device comprising:

a frame defining a receptacle for a plurality of articles and including means to display at least one of the articles for viewing in a first position;

means on the frame for urging articles on said receptacle towards said first position so that when an article is removed by a purchaser from said first position another article is urged into said first position;

means on the frame for prohibiting removal of articles in said receptacle that are not in said first position;

means on the frame for inhibiting grasping by a purchaser of an article in the first position;

trigger means movable relative to the frame between a normal position and a release position for moving an article from the first position relative to the frame to a removal position as an incident of movement of said trigger means from said normal position to said release position, said removal position being such that an article in said removal position can be more readily grasped by a purchaser than an article in said first position; and means responsive to movement of the trigger means from the normal position to the release position for giving a sensory indication that the trigger means has been moved from the normal position to the release position and that resultingly an article has been situated in the removal position; and means for biasing the trigger to its normal position, wherein said trigger means comprises a trigger and means for pivotally mounting the trigger for movement between said normal position and release position and said trigger has a surface to engage an article in said receptacle in said first position and move an article from the first position to the removal position as the trigger is pivoted from the normal position to the release position, wherein said biasing means and means for giving a sensory indication comprise the same element.

* * * * *